(12) United States Patent
Iwakiri (10) Patent No.: US 7,655,917 B2
(45) Date of Patent: Feb. 2, 2010

(54) RADIATION IMAGE DETECTION APPARATUS, RESIDUAL CHARGE AMOUNT ESTIMATION METHOD FOR USE WITH THE APPARATUS AND PROGRAM THEREFOR

(75) Inventor: Naoto Iwakiri, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/059,054

(22) Filed: Mar. 31, 2008

(65) Prior Publication Data

US 2008/0237508 A1 Oct. 2, 2008

(30) Foreign Application Priority Data

Mar. 30, 2007 (JP) .............................. 2007-090111

(51) Int. Cl.
    *H01L 27/00* (2006.01)
(52) U.S. Cl. ................................. 250/370.09
(58) Field of Classification Search .......... 250/370.01–370.15; 378/98.9, 19, 116, 141, 378/142, 189, 190, 196–200

See application file for complete search history.

(56) References Cited

U.S. PATENT DOCUMENTS 6,342,700 B1 * 1/2002 Izumi et al. ............ 250/370.13

FOREIGN PATENT DOCUMENTS

JP 2003-10159 A 1/2003

OTHER PUBLICATIONS

MacQuigg, "Residual Charge on a Switched Capacitor," 1983, IEEE Journal of Solid-State Circuits, vol. SC-18, No. 6, pp. 811-813.*

Ito et al., "Leak current characterization in high frequency operation of CMOS circuits fabricated on SOI substrate,", 1995, Proceedings of IEEE international conference on microelectronic test structures, vol. 8, pp. 67-70.*

* cited by examiner

*Primary Examiner*—David P Porta
*Assistant Examiner*—Kiho Kim
(74) *Attorney, Agent, or Firm*—Sughrue Mion, PLLC (57) ABSTRACT

A residual charge amount estimation method including the steps of: providing a radiation image detector including pixels, scanning lines, and data lines, each pixel having a collection electrode, a capacitor, and a TFT switch; detecting a leak current flowing out through each data line with the TFT switches being switched OFF; reading out an image signal flowing out through each data line by sequentially switching ON the TFT switches connected to each scanning line on a scanning line-by-scanning line basis; calculating an average leak current per unit saturated pixel from the leak current detected from at least one of the data lines on which a saturated pixel having a saturated value of the image signal is found and the number of saturated pixels; and estimating the amount of residual charges remaining in the unit saturated pixel based on the average leak current.

14 Claims, 7 Drawing Sheets

RADIATION IMAGE DETECTION APPARATUS, RESIDUAL CHARGE AMOUNT ESTIMATION METHOD FOR USE WITH THE APPARATUS AND PROGRAM THEREFOR

BACKGROUND OF THE INVENTION

1. Field of the Invention

The present invention relates to a radiation image detection apparatus for detecting a radiation image by a radiation image detector including multitudes of pixels disposed two-dimensionally, each having a TFT switch, and a residual charge amount estimation method for use with the apparatus. The invention also relates to a computer program product for causing a computer to perform the residual charge amount estimation method.

2. Description of the Related Art

Radiation image detection system having a TFT (Thin Film Transistor) active matrix array on which a radiation sensitive layer is disposed, and is capable of tentatively storing latent image charges generated according to radiation transmitted through a subject and reading out the stored latent image charges as electrical signals are known.

Figure 11:
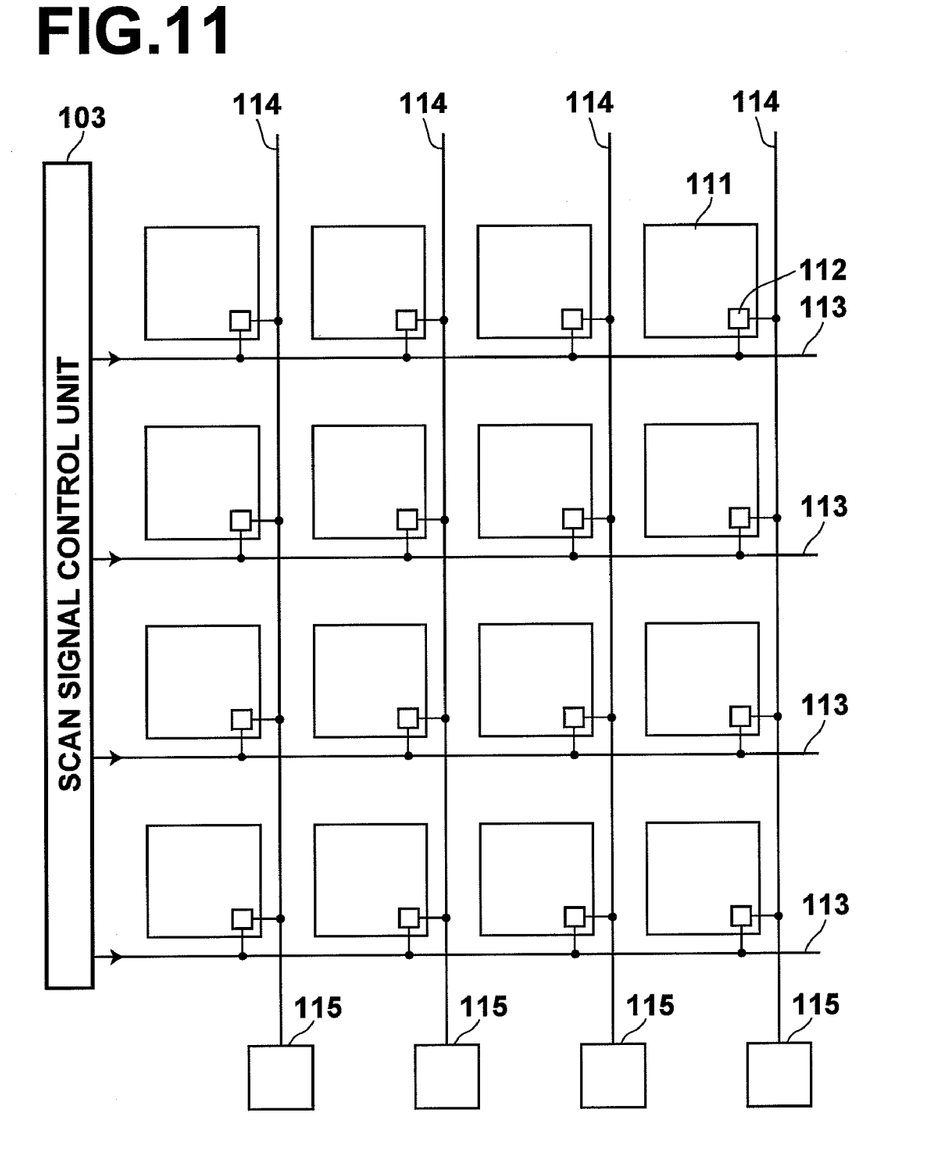
FIG. 11 is a schematic configuration diagram of a conventional radiation image detector.

First, the structure of a conventional radiation image detection system will be described with reference to FIG. 11. FIG. 11 is a schematic equivalent circuit of 4×4 pixels. In FIG. 11, the reference numerals 111, 112, 113, and 114 respectively denote a capacitor, a TFT switch, a scanning line, and a data line.

Radiation, such as X-rays or the like, entered from a direction normal to the surface of FIG. 11 are converted to charges in the radiation sensitive layer and stored in each of the capacitor 111. Thereafter, the stored charges are transferred to the data lines 114 connected to either one of the source/drain electrodes of the TFT switches 112 by sequentially activating the TFT switches 112 by the scanning lines 113, and detected by the signal detectors 115.

In such type of radiation image detection system, the stored charges are erased by the readout operation and the like, but if the erasure of the stored charges is incomplete, remaining charges are retained within the radiation image detector as residual charges, which are gradually decreasing over a comparatively long time. If a next imaging is performed while the residual charges are not completely erased, the retained residual charges are detected together with the image signals of next imaging, which becomes an obstacle for an accurate measurement of inputted amount of radiation.

In order to solve this problem, for example, Japanese Unexamined Patent Publication No. 2003-010159 proposes a method for estimating the amount of residual charges remaining in a radiation image detector using pixel values of a radiation image obtained by the radiation image detector, and correcting pixel values of a radiation image obtained by next imaging.

If a large amount of radiation exceeding a predetermined value is irradiated on a certain region of the pixel array of the radiation image detector, an excessive amount of latent image charges generated according to the radiation is stored in each of the pixels within the region. This causes an increased amount of residual charges retained in the radiation image detector, while the pixel values are limited to the upper limit saturation value of the signal range and unable to obtain dose information greater than the saturation value. Thus, the method for estimating the amount of residual charges using pixel values described in Japanese Unexamined Patent Publication No. 2003-010159 is not able to accurately estimate the amount of residual charges when the amount of inputted radiation exceeds the predetermined value.

In view of the circumstances described above, it is an object of the present invention to provide a radiation image detection apparatus capable of estimating the amount of residual charges remaining in the radiation image detector even when a large amount of radiation exceeding a predetermined value (a value by which the pixel value is saturated) is irradiated on the radiation image detector, and a residual charge amount estimation method for use with the apparatus. It is a further object of the present invention to provide a computer program product for causing a computer to perform the residual charge amount estimation method.

SUMMARY OF THE INVENTION

The residual charge amount estimation method of the present invention is a method for estimating the amount of residual charges remaining in a radiation image detector which includes a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines through which the charges stored in the capacitors are read out, the method including the steps of:

detecting a leak current flowing out through each of the data lines with each of the TFT switches being switched OFF;

reading out an image signal flowing out through each of the data lines by sequentially switching ON the TFT switches connected to each of the scanning lines on a scanning line-by-scanning line basis;

calculating an average leak current per unit saturated pixel from the leak current detected from at least one of the data lines on which a saturated pixel having a saturated value of the image signal is found and the number of saturated pixels; and estimating the amount of residual charges remaining in the unit saturated pixel based on the average leak current.

The radiation image detection apparatus of the present invention is an apparatus for detecting a radiation image using a radiation image detector which includes a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines through which the charges stored in the capacitors are read out, the apparatus including:

a leak current detection means that detects a leak current flowing out through each of the data lines with each of the TFT switches being switched OFF;

an image signal readout means that reads out an image signal flowing out through each of the data lines by sequentially switching ON the TFT switches connected to each of the scanning lines on a scanning line-by-scanning line basis;

an average leak current calculation means that calculates an average leak current per unit saturated pixel from the leak current detected from at least one of the data lines on which a saturated pixel having a saturated value of the image signal is found and the number of saturated pixels; and a residual charge amount estimation means that estimates the amount of residual charges remaining in the unit saturated pixel based on the average leak current.

The radiation image detection apparatus of the present invention described above may includes: a required time calculation means that calculates a required time for the amount of residual charges to decrease below a predetermined threshold value using a decreasing rate at which the amount of residual charges decreases with time obtained in advance; and a warning means that outputs a warning at least once during a time period from the time when the amount of residual charges is estimated to the time when the required time is expired.

Further, the apparatus may include: a required time calculation means that calculates a required time for the amount of residual charges to decrease below a predetermined threshold value using a decreasing rate at which the amount of residual charges decreases with time obtained in advance; and a restriction means that restricts imaging a radiation image with the radiation image detector during a time period from the time when the amount of residual charges is estimated to the time when the required time is expired.

Still further, the apparatus may include: a required time calculation means that calculates a required time for the amount of residual charges to decrease below a predetermined threshold value using a decreasing rate at which the amount of residual charges decreases with time obtained in advance; and a residual charge erasing means that erases the residual charges at the time of next imaging after estimating the amount of residual charges and if the required time is not expired.

The leak current detection means may include a leak current correction means that corrects the value of the detected leak current using a decreasing rate at which the amount of leak currents decreases with time obtained in advance based on an elapsed time at the time when the leak current is detected from the time when the radiation is irradiated.

The computer program product of the present invention is a computer program product for causing a computer to perform a residual charge estimation method for estimating the amount of residual charges remaining in a radiation image detector which includes a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines through which the charges stored in the capacitors are read out, the method including the steps of:

detecting a leak current flowing out through each of the data lines with each of the TFT switches being switched OFF;

reading out an image signal flowing out through each of the data lines by sequentially switching ON the TFT switches connected to each of the scanning lines on a scanning line-by-scanning line basis;

calculating an average leak current per unit saturated pixel from the leak current detected from at least one of the data lines on which a saturated pixel having a saturated value of the image signal is found and the number of saturated pixels; and estimating the amount of residual charges remaining in the unit saturated pixel based on the average leak current.

The estimation of the residual charge amount described above may include estimations performed by various methods in which an average leak current per unit saturated pixel is calculated from the leak current detected from at least one of the data lines on which a saturated pixel having a saturated value of the image signal is found and the number of saturated pixels on the data line, and the amount of residual charges remaining in the unit saturated pixel is estimated based on the average leak current. The estimation may be performed by calculating an average leak current per unit saturated pixel from the leak current detected from a single data line on which a saturated pixel having a saturated value of the image signal is found and the number of saturated pixels on the data line, and based on the average leak current. Alternatively, the estimation may be performed by calculating an average leak current per unit saturated pixel for each of a plurality of data lines from the plurality of leak currents detected from the plurality of data lines on which saturated pixels having saturated image signal values are present and the number of saturated pixels on each of the data lines, and based on these averages of leak currents, for example, based on the maximum value of these averages. Still further, the residual charge amount may be estimated by calculating an average leak current per unit saturated pixel from the total of a plurality of leak currents detected from a plurality of data lines on which saturated pixels having saturated image signal values are present and the total number of saturated pixels on the respective data lines, and based on the average leak current.

According to the radiation image detection apparatus, residual charge amount detection method for use with the apparatus, and computer program product of the present invention, the amount of residual charges remaining in a radiation image detector is estimated. The radiation image detector includes a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines through which the charges stored in the capacitors are read out. The amount of residual charge is estimated by detecting a leak current flowing out through each of the data lines with each of the TFT switches being switched OFF; reading out an image signal flowing out through each of the data lines by sequentially switching ON the TFT switches connected to each of the scanning lines on a scanning line-by-scanning line basis; calculating an average leak current per unit saturated pixel from the leak current detected from at least one of the data lines on which a saturated pixel having a saturated value of the image signal is found and the number of saturated pixels; and estimating the amount of residual charges remaining in the unit saturated pixel based on the average leak current. This may improve the estimation capabilities for estimating the amount of residual charges remaining in the radiation image detector when a large amount of radiation exceeding a predetermined value (a value by which the pixel value is saturated) is irradiated.

More specifically, in the radiation image detector, it is desirable that no leak current flows out to each data line while the TFT switches are switched OFF. If a large amount of radiation exceeding a predetermined value is irradiated on a certain region of the pixel array of the radiation image detector, however, the pixels in the region are saturated and excessive signal charges leak from the saturated pixels to each data line, and a leak current, which is the sum of the leak signals of all of the saturated pixels on each data line, flows through each data line. Accordingly, the amount of residual charges may be estimated by calculating the average leak current from the leak current flowing out through each data line and the number of saturated pixels on each data line, and based on the average leak current.

If the radiation image detection apparatus of the present invention includes: a required time calculation means that calculates a required time for the amount of residual charges to decrease below a predetermined threshold value using a decreasing rate at which the amount of residual charges decreases with time obtained in advance; and a warning means that outputs a warning at least once during a time period from the time when the amount of residual charges is estimated to the time when the required time is expired, the user may recognize by the warning that the amount of residual charges is grater than the predetermined threshold value, so that the next imaging may be performed at an appropriate timing.

If the radiation image detection apparatus of the present invention includes: a required time calculation means that calculates a required time for the amount of residual charges to decrease below a predetermined threshold value using a decreasing rate at which the amount of residual charges decreases with time obtained in advance; and a restriction means that restricts imaging a radiation image with the radiation image detector during a time period from the time when the amount of residual charges is estimated to the time when the required time is expired, imaging is allowed only after the amount of residual charges falls below a predetermined threshold value, so that the image quality of a radiation image obtained by imaging may be maintained above a predetermined level.

If the radiation image detection apparatus of the present invention includes: a required time calculation means that calculates a required time for the amount of residual charges to decrease below a predetermined threshold value using a decreasing rate at which the amount of residual charges decreases with time obtained in advance; and a residual charge erasing means that erases the residual charges at the time of next imaging after estimating the amount of residual charges and if the required time is not expired, when imaging is performed at a timing desired by the user, the amount of residual charges remaining in the radiation image detector may be reduced within an allowable range, thereby the image quality of a radiation image obtained by the imaging may be improved.

Further, if the leak current detection means includes a leak current correction means that corrects the value of the detected leak current using a decreasing rate at which leak currents decreases with time obtained in advance based on an elapsed time at the time when the leak current is detected from the time when the radiation is irradiated, the estimation accuracy of the amount of residual charges may be improved.

DESCRIPTION OF THE PREFERRED EMBODIMENTS

Figure 1:
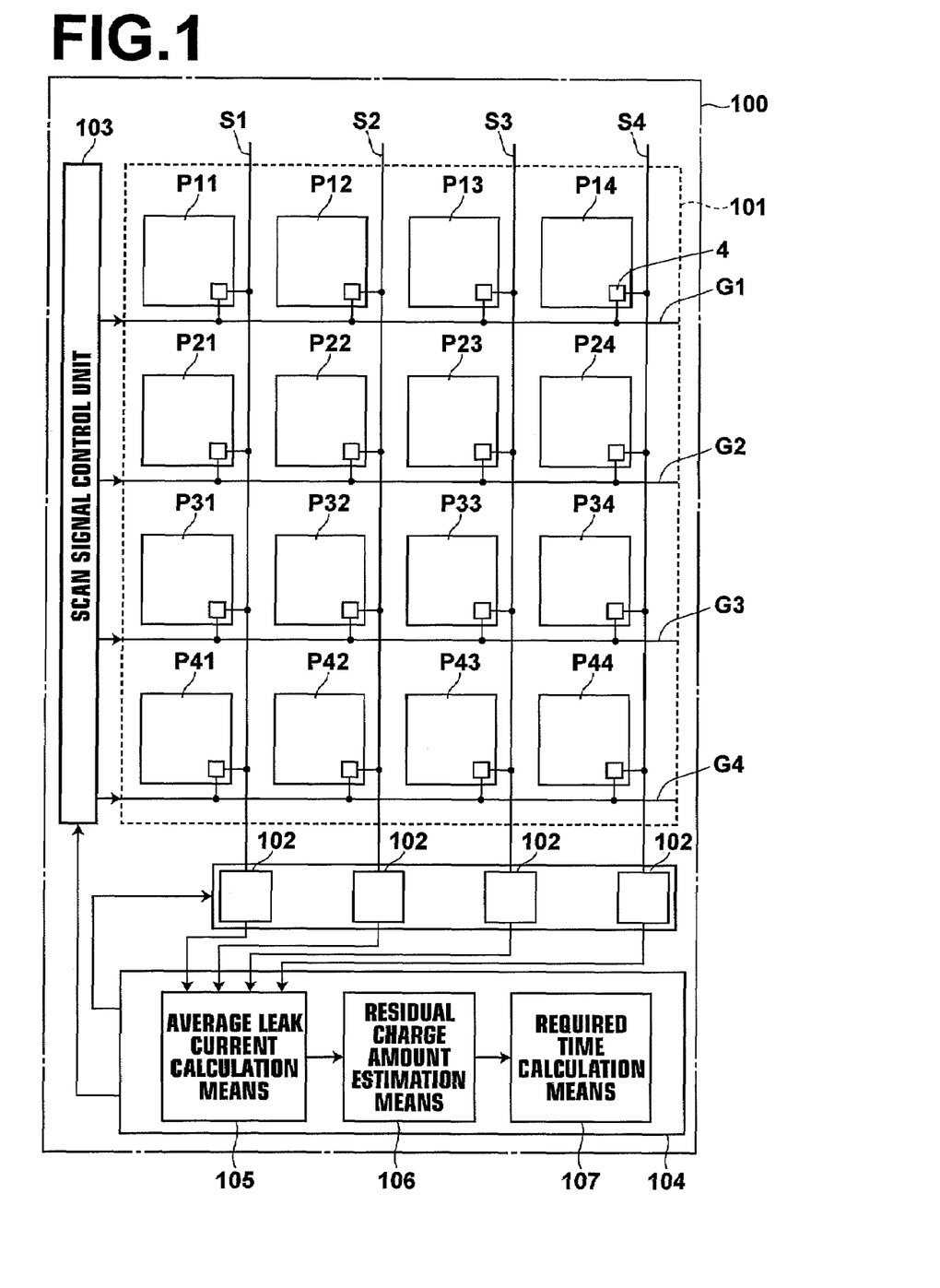
FIG. 1 is a schematic configuration diagram of a radiation image detection apparatus to which an embodiment of the residual charge amount estimation apparatus of the present invention is applied.

Hereinafter, an exemplary embodiment of the radiation image detection apparatus of the present invention will be described with reference to the accompanying drawings. It is noted that a radiation image detection apparatus 100 shown in FIG. 1 is configured by executing a residual charge amount estimation program, read into an auxiliary storage device, on a computer (e.g., a personal computer or the like). The residual charge amount estimation program is distributed recorded on an information recording medium or through a network, such as the Internet and installed on the computer.

The radiation image detection apparatus 100 includes: a radiation image detector 101; a signal detector 102 that detects a signal outputted from the radiation image detector 101; a scan signal control unit 103 that outputs scan signals to scanning lines G of the radiation image detector 101; and a residual charge amount estimation unit 104 that performs a process for estimating the amount of residual charges in the radiation image detector 101 by obtaining the signal detected by the signal detector 102, and outputs control signals to the signal detector 102 and scan signal control unit 103.

The radiation image detector 101 includes multitudes of pixels Pij (i=1 to 4, j=1 to 4) disposed two-dimensionally, each including: an image sensor section having a bias electrode 7, a semiconductor film 6, and a charge collection electrode 11; a capacitor 5 for storing charge signals detected by the image sensor section; and a TFT switch 4 for reading out the charges stored in the capacitor 5. In addition, multitudes of scanning lines G for switching ON/OFF the TFT switches 4 and multitudes of data lines S for reading out the charges stored in the capacitors 5 are provided. It is assumed in the present embodiment that the radiation image detector 101 includes 4×4 pixels disposed two-dimensionally in order to facilitate understanding of the present invention.

Figure 6:
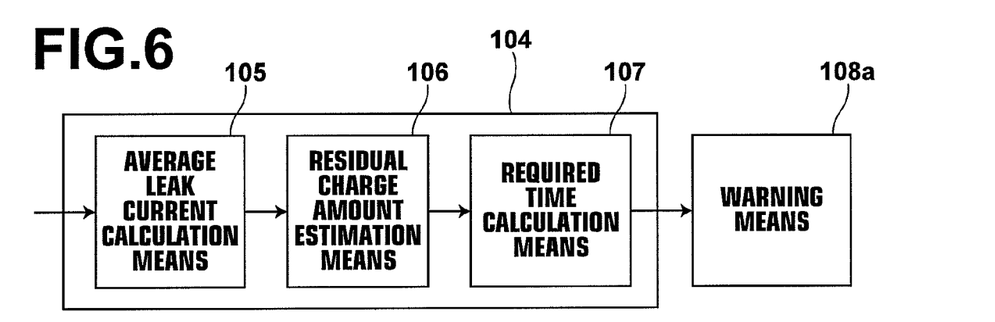
FIG. 6 illustrates a warning means.
Figure 7:
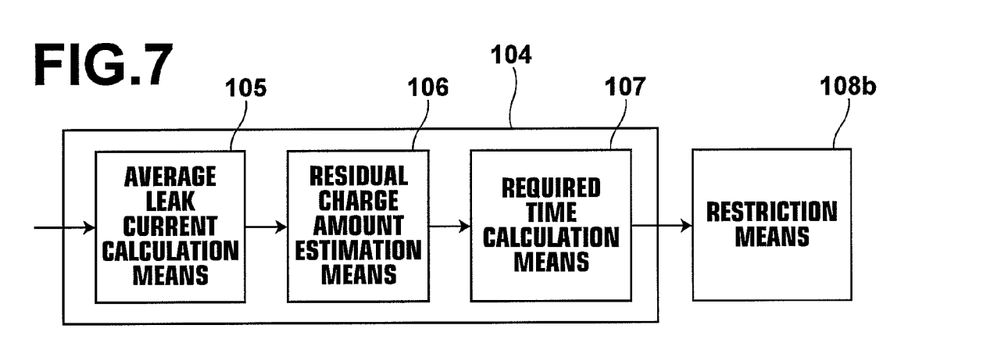
FIG. 7 illustrates a restriction means
Figure 8:
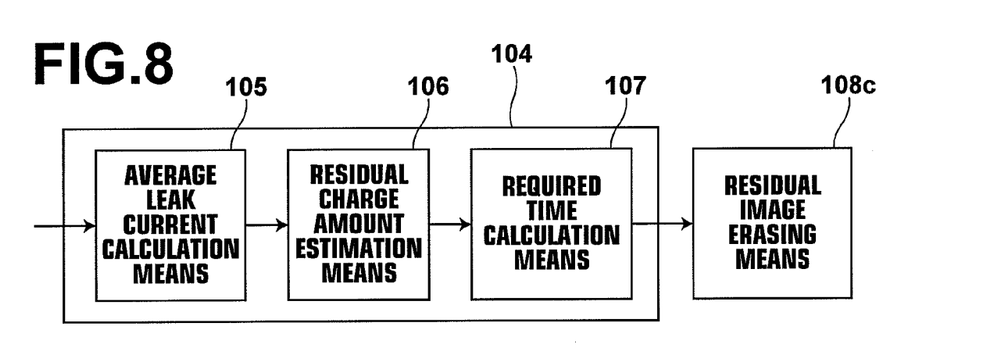
FIG. 8 illustrates a residual image erasing means

The residual charge amount estimating unit 104 includes: an average leak current calculation means 105 that calculates an average leak current per unit saturated pixel of the radiation image detector 101; a residual charge amount estimation means 106 that estimates the amount of residual charges present in the radiation image detector 101 based on the average leak current; a required time calculation means 107 that calculates a required time until the amount of residual charges obtained by the residual charge amount estimation means 106 is reduced below a predetermined threshold value; and other processing means that perform various processes using the required time calculated by the required time calculation means 107, such as a warning means 108a, a restriction means 108b, a residual image erasing means 108c, and the like (FIGS. 6, 7, and 8).

Figure 2:
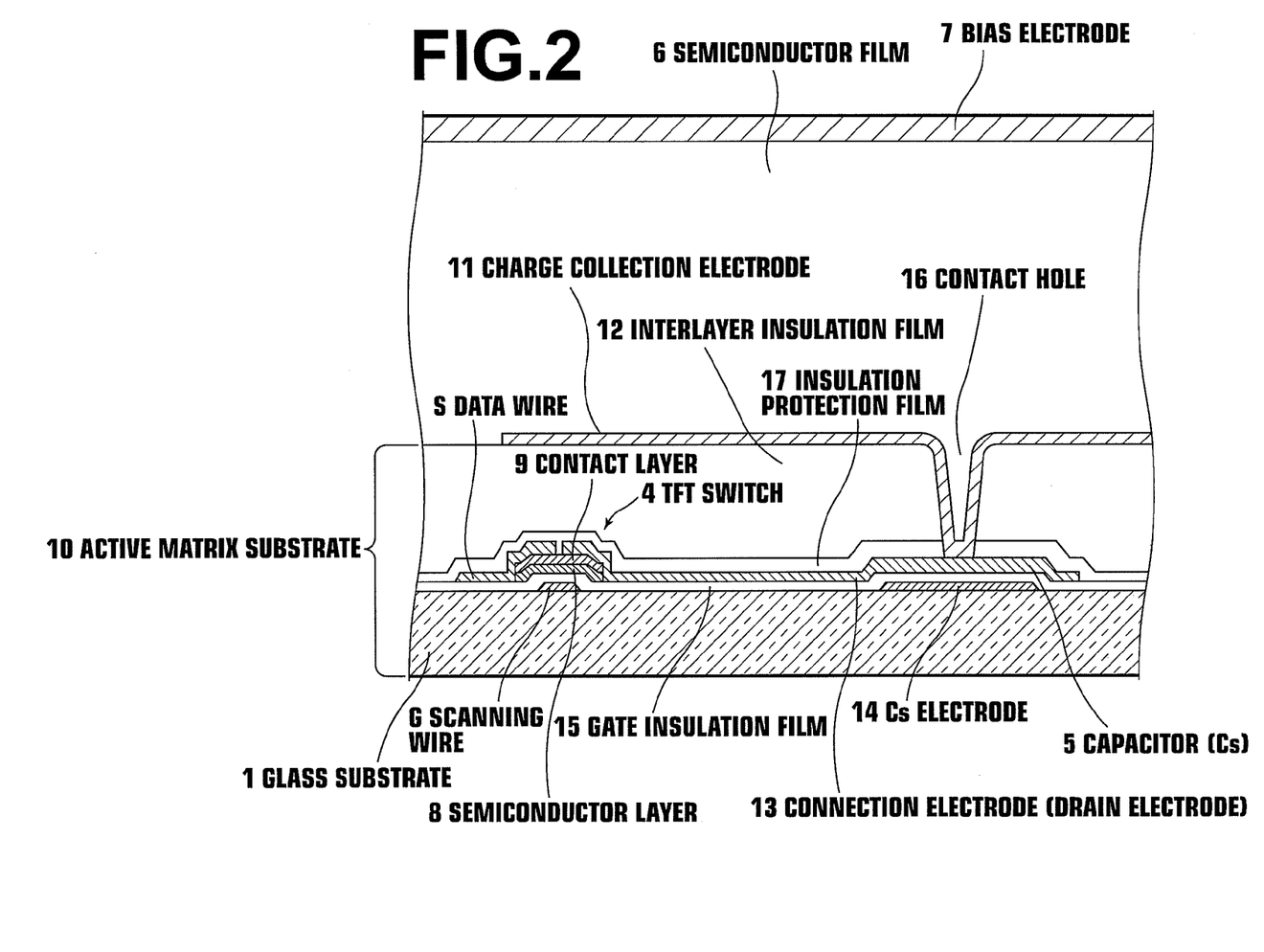
FIG. 2 is a cross-sectional view of the radiation image detector shown in FIG. 1, illustrating the structure of a single pixel.
Figure 3:
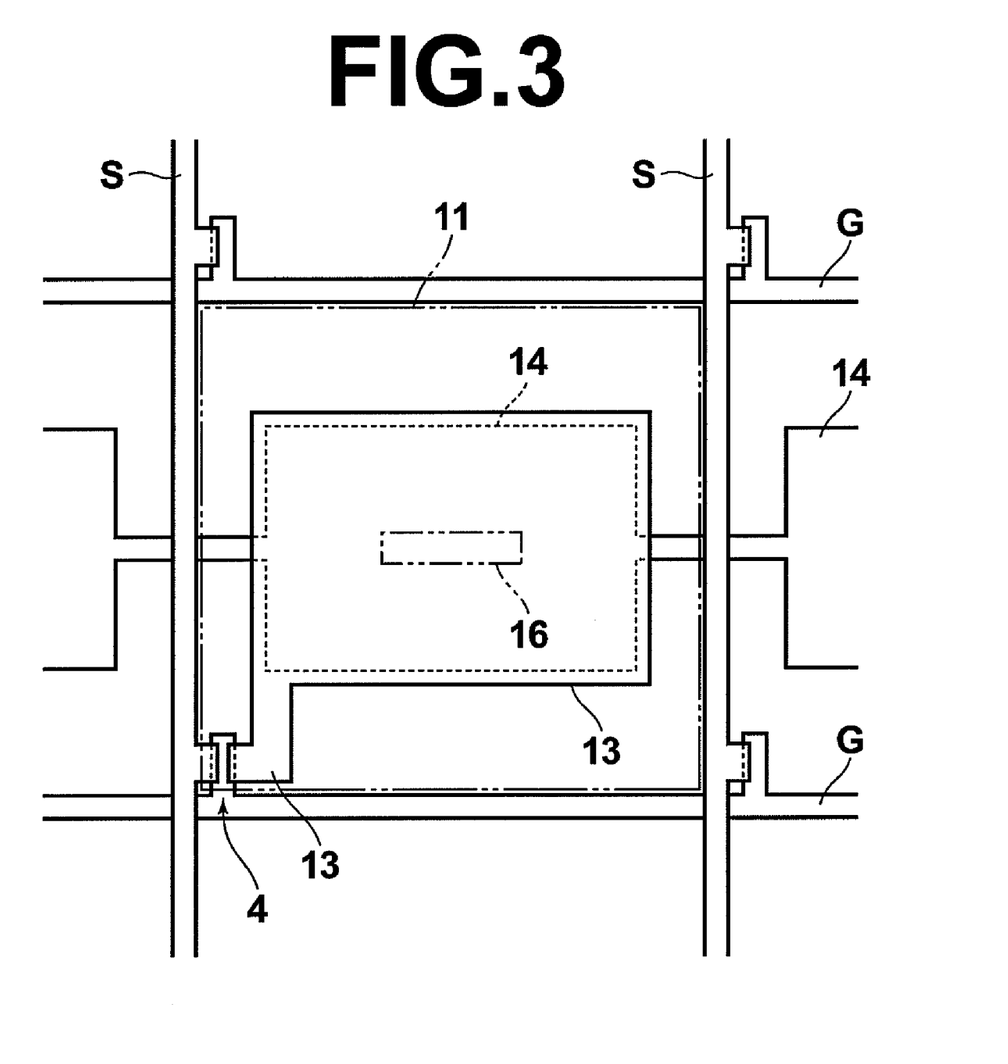
FIG. 3 is a plan view of the radiation image detector shown in FIG. 1, illustrating the structure of a single pixel.

Now, the radiation image detector 101 will be described in more detail. FIG. 2 is a cross-sectional view of the radiation image detector 101, illustrating the structure of a single pixel, and FIG. 3 is a plan view thereof.

As illustrated in FIG. 2, the radiation image detector 101 includes an active matrix substrate 10 on which a semiconductor film 6 that generates therein charges (electron-hole pairs) by receiving radiation, and a bias electrode (common electrode) 7 connected to a not shown high voltage power source are stacked in this order. The semiconductor film 6 is provided for converting image information represented by radiation to charge information. The semiconductor film 6 is, for example, made of selenium-based amorphous a-Se (amorphous selenium). The referent of "selenium-based" as used herein means that selenium is included 50% or more.

Hereinafter, the active matrix substrate 10 will be described in more detail.

The active matrix substrate 10 includes a glass substrate 1, a scanning line G, a capacitor electrode (Cs electrode) 14, a gate insulation film 15, a connection electrode 13, a semiconductor layer 8, a contact layer 9, a data line S, an insulation protection film 17, an interlayer insulation film 12, and a charge collection electrode 11.

The thin film transistor (TFT) 4 is formed by the scanning line G, gate insulation film 15, data line S, connection electrode 13, semiconductor layer 8, contact layer 9, and the like, and the capacitor (Cs) 5 is formed by the Cs electrode 14, gate insulation film 15, connection electrode 13, and the like.

The glass substrate 1 is the supporting substrate and, for example, non-alkali glass may be used for this purpose. The scanning lines G and data lines G are electrode wires disposed in a grid pattern, and the thin film transistor (TFT switch) 4 is formed at each intersection thereof. The TFT switch 4 is a switching element, and the source and drain thereof are connected to the data line S and connection electrode 13 respectively. The data line S is the source electrode and the connection electrode 13 is the drain electrode of the TFT switch 4. That is, the data line S includes a linear portion serving as the signal line and an extended portion for forming the TFT switch 4. The connection electrode 13 is provided to connect the TFT switch 4 with the capacitor 5.

The gate insulation film 15 is made of SiNx, SiOx, or the like. The gate insulation film 15 is disposed to cover the scanning line G and Cs electrode 14, and the portion located over the scanning line G acts as the gate insulation film of the TFT switch 4, and the portion located over the Cs electrode 14 acts as the dielectric layer of the capacitor 5. That is, the capacitor 5 corresponds to the region where the Cs electrode 14, which is formed on the same layer as the scanning line G, and the connection electrode 13 are stacked on top of another. It is noted that an anodized oxide film obtained by anodizing the scanning line G and Cs electrode 14 may also be used in combination with SiNx or SiOx for the gate insulation film 15.

The semiconductor layer (i layer) 8 corresponds to the channel section of the TFT switch 4, which is a current channel for connecting between the data line S and connection electrode 13. The contact layer ($n^+$ layer) 9 provides a contact between the data line S and connection electrode 13.

The insulation protection film 17 extends substantially the entire surface (area) over the data line S and connection electrode 13, i.e., over the glass substrate 1. The insulation protection film 17 provides electrical insulation between the data line S and connection electrode 13, as well as protecting them. The insulation protection film 17 has a contact hole 16 at a predetermined position, i.e., the position over the portion of the connection electrode 13 facing the Cs electrode 14 across the capacitor 5.

The charge collection electrode 11 is made of a transparent conductive amorphous oxide film. The charge collection electrode 11 is formed to fill the contact hole 16 and stacked over the data line S and connection electrode 13. The charge collection electrode 11 is electrically communicating with the semiconductor film 6 so as to be able to collect charges generated in the semiconductor film 6.

The interlayer insulation film 12 is made of an acrylic resin having photosensitivity and provides electrical insulation for the TFT switch 4. The contact hole 16 runs through the interlayer insulation film 12, and the charge collection electrode 11 is connected to the connection electrode 13.

The scanning line G and Cs electrode 14 are provided on the glass substrate 1. The semiconductor layer (i layer) 8 and contact layer ($n^+$ layer) 9 are stacked in this order over the scanning line G via the gate insulation film 15. The data line S and connection electrode 13 are formed on the contact layer 9. The connection electrode 13 is stacked over the layer forming the capacitor 5. The insulation protection layer 17 is disposed on the connection electrode 13 and data line S.

The interlayer insulation film 12 of the TFT switch 4 is provided on the insulation protection layer 17. The charge collection electrode 11 is provided in the upper layer of the interlayer insulation film 12, i.e., the uppermost layer of the active matrix substrate 10. The charge collection electrode 11 is connected to the TFT switch 4 through the connection electrode 13.

The gate insulation film 15 is provided on the Cs electrode 14, and the connection electrode 13 is disposed on the gate insulation film 15. The charge collection electrode 11 is connected to the connection electrode 13 through the contact hole 16 running through the interlayer insulation film 12.

A not shown high voltage power source is connected between the bias electrode 7 and Cs electrode 14. A voltage is applied between the bias electrode 7 and Cs electrode 14 by the high voltage power source, which causes an electric field to be generated between the bias electrode 7 and Cs electrode 14 across the capacitor 5. Here, the semiconductor film 6 and capacitor 5 are electrically connected in series, so that when a bias voltage is applied to the bias electrode 7, charges (electron-hole pairs) are generated in the semiconductor film 6. The electrons generated in the semiconductor film 6 are moved to the positive electrode side and holes are moved to the negative electrode side, causing charges to be stored in the capacitor 5.

The entire radiation image detector 101 includes a plurality of charge collection electrodes 11 disposed two-dimensionally, a plurality of capacitors 5, each connected to each charge collection electrode 11, and a plurality of TFT switches 4, each connected to each capacitor 5. This allows two-dimensional electromagnetic information to be tentatively stored in the capacitors 5, and the two-dimensional charge information may be read out easily by sequentially scanning the TFT switches 4.

An example manufacturing process of the radiation image detector 101 will now be described.

First, a metal film of Ta, Al, or the like is formed on the glass substrate 1 by sputter deposition with a thickness of approximately 300 nm, and the scanning lines G and Cs electrodes 14 are formed by patterning the film in a desired shape.

Next, the gate insulation film 15 made of SiNx, SiOx, or the like is formed substantially over the entire surface of the glass substrate 1 with a thickness of approximately 350 nm by CVD (Chemical Vapor Deposition) so as to cover the scanning lines G and Cs electrodes 14. It is noted that an anodized oxide film obtained by anodizing the scanning lines G and Cs electrodes 14 may also be used in combination with SiNx or SiOx for the gate insulation film 15.

Then, amorphous silicon (a-Si) film is formed by CVD with a thickness of approximately 100 nm such that the semiconductor layers 8 are disposed over the scanning lines G via the gate insulation film 15, and the semiconductor layers 8 are formed by patterning the film in a desired shape.

Next, a-Si film is formed by CVD with a thickness of approximately 40 nm such that the contact layers 9 are disposed in the upper layer of the channel layers 8, and the contact layers 9 are formed by patterning the film in a desired shape.

Further, a metal film of Ta, Al, or the like is formed on the contact layers 9 with a thickness of approximately 300 nm, and data lines S and connection electrodes 13 are formed by patterning the film in a desired shape.

Then, in order to form the insulation protection film 17, a SiNx film substantially covering the entire region of the glass substrate 1, having the TFT switches 4, capacitors 5, and the like formed thereon, is formed by CVD with a thickness of approximately 300 nm. Thereafter, the SiNx film formed on a predetermined portion of the connection electrode 13 is removed to create a portion of the contact hole 16.

Next, in order to form the interlayer film 12, an acrylic resin film or the like having photosensitivity is formed with a thickness of approximately 3 μm to cover substantially the entire surface of the insulation protection film 17. Then, patterning is performed by photolithography technique to form a portion of the contact hole 16 by aligning with the portion of the contact hole 16 of the insulation protection film 17.

Then, a transparent conductive amorphous oxide film, such as ITO (Indium-Tin-Oxide) film, is formed on the interlayer insulation layer 12 by sputter deposition with a thickness of approximately 200 nm, and the charge collection electrodes 11 are formed by patterning the film in a desired shape. Here, each charge collection electrode 11 is electrically communicated (short-circuited) with each connection electrode 13 through each contact hole 16 running through the insulation protection layer 17 and interlayer insulation film 12.

In the present embodiment, the active matrix substrate 10 adopts a so-called roof structure (mushroom electrode structure) in which the charge collection electrode 11 overlaps with the TFT switch 4 on the upper side thereof as described above. But, a non-roof structure may also be adopted. Further, as the switching element, the TFT 4 using a-Si is employed, but p-Si (poly silicon) may also be used. Still further, although an inversely staggered structure in which the data lines S and connection electrodes 13 are positioned above the scanning lines G via the gate insulation film 15 is adopted, a staggered structure may also be employed.

Next, the semiconductor film 6 of a-Se is formed to cover the entire pixel array region of the active matrix substrate 10 by vacuum deposition with a thickness of approximately 0.5 to 1.5 mm.

Finally, the bias electrode 7 of Au, Al, or the like is formed on substantially the entire surface of the semiconductor film 6 by vacuum deposition with a thickness of approximately 200 nm.

It is noted that a charge injection blocking layer for blocking electrons or holes from entering into the semiconductor film 6, or a buffer layer for improving contact between the semiconductor layer 6 and charge collection electrode 11 may be provided at the interface between the semiconductor layer 6 and charge collection electrode 11. Likewise, a charge injection blocking layer or a buffer layer may be provided at the interface between the semiconductor film 6 and bias electrode 7. As for the material of the charge injection blocking layer or buffer layer, a-Se including a-$As_2Se_3$, alkali element ion, or halogen element ion added thereto, or the like may be used.

Next, the operational principle of the radiation image detector 101 structured in the aforementioned manner will be described. When radiation is irradiated on the semiconductor film 6 while a voltage is applied between the bias electrode 7 and Cs electrodes 14, charges (electron-hole pairs) are generated in the semiconductor film 6. The electrons generated in the semiconductor film 6 are moved to the positive electrode side and holes are moved to the negative electrode side, causing charges to be stored in the capacitors 5, since the semiconductor film 6 and each of the capacitors 5 are electrically connected in series.

Charges stored in each of the capacitors 5 may be read out to outside through the data line S by inputting a signal to the scanning line G and switching ON the TFT switch.

The scanning lines G, data lines S, TFT switches 4, and capacitors 5 are all provided in XY matrices, so that the image information represented by the radiation may be obtained two-dimensionally by sequentially scanning the signal to be inputted to the scanning lines G and detecting charge signals from the data lines S with respect to each data lines.

Next, the operation of the radiation image detection apparatus 100 will be described.

First, radiation image recording is performed by irradiating radiation on the radiation image detector 101. Charges generated in the semiconductor film 6 according to the amount of irradiated radiation are collected by the charge collection electrodes 11 and stored in the capacitors 5 electrically connected to the charge collection electrodes 11.

Then, a control signal for leak level detection is outputted from the residual charge amount estimation apparatus 104 to the scan signal control unit 103 and signal detector 102. Then, signals flowing out through the respective data lines S1 to S4, i.e., leak currents C1 to C4 are detected by the respective signal detectors 102 connected to the respective data lines S1 to S4 with a signal for switching OFF the TFT switches being applied to each of the scanning lines G from the scan signal control unit 103. The leak signals C1 to C4 detected by the respective signal detectors 102 are outputted to the average leak current calculation means 105.

Figure 5:
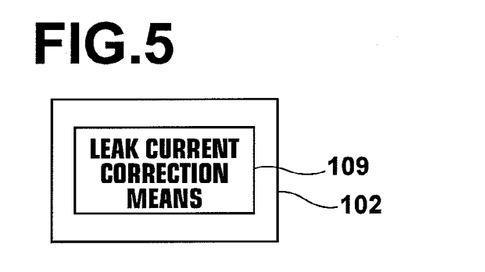
FIG. 5 illustrates the configuration of the signal detector shown in FIG. 1.

It is noted that leak current values vary with the detection timing, since the leak currents decrease with time from the time of irradiation of radiation. Consequently, as illustrated in FIG. 5, a leak current correction means 109 included in each signal detector 102 corrects the detected leak current value to a value to be detected at an arbitrarily set time based on the time elapsed from the irradiation of radiation using a decreasing rate at which the amount of leak currents decreases with time from the time of irradiation of radiation obtained in advance, and the corrected leak current value is outputted to the average leak current calculation means 105.

Then, a control signal for image signal detection is outputted from the residual charge amount estimation unit 104 to the scan signal control unit 103. In response to the control signal, a scan signal for switching ON the TFT switches 4 is sequentially outputted from the scan signal control unit 103 to each of the scanning lines G4 to G1. Further, the control signal for image signal detection is also outputted to the signal detectors 102 from the residual charge amount estimation unit 104, and in response to the control signal, signals flowing out through the respective data lines S1 to S4, i.e., image signals D are detected by the respective signal detectors 102 connected to the respective data lines S1 to S4.

More specifically, the scan signal for switching ON the TFT switches is outputted from the scan signal control unit 103 to the data line G4, and the image signals D41 to D44 of the pixels P41 to P44 connected to the scanning line G4 flow out to the data lines S1 to S4 connected to the respective pixels and detected by the respective signal detectors 102. Then, the scan signal for switching ON the TFT switches is outputted from the scan signal control unit 103 to the data line G3, and the image signals D31 to D34 of the pixels P31 to P34 connected to the scanning line G3 flow out to the data lines S1 to S4 connected to the respective pixels and detected by the respective signal detectors 102. In this way, by sequentially outputting the scan signals for switching ON the TFT switches from the scan signal control unit 103 to the scanning lines G2 and G1, the image signals D11 to D24 of the pixels connected to the respective scanning lines may be detected. Then, the detected image signals D11 to D44 of the respective pixels P11 to P44 are outputted to the average leak current calculation means 105.

Figure 4:
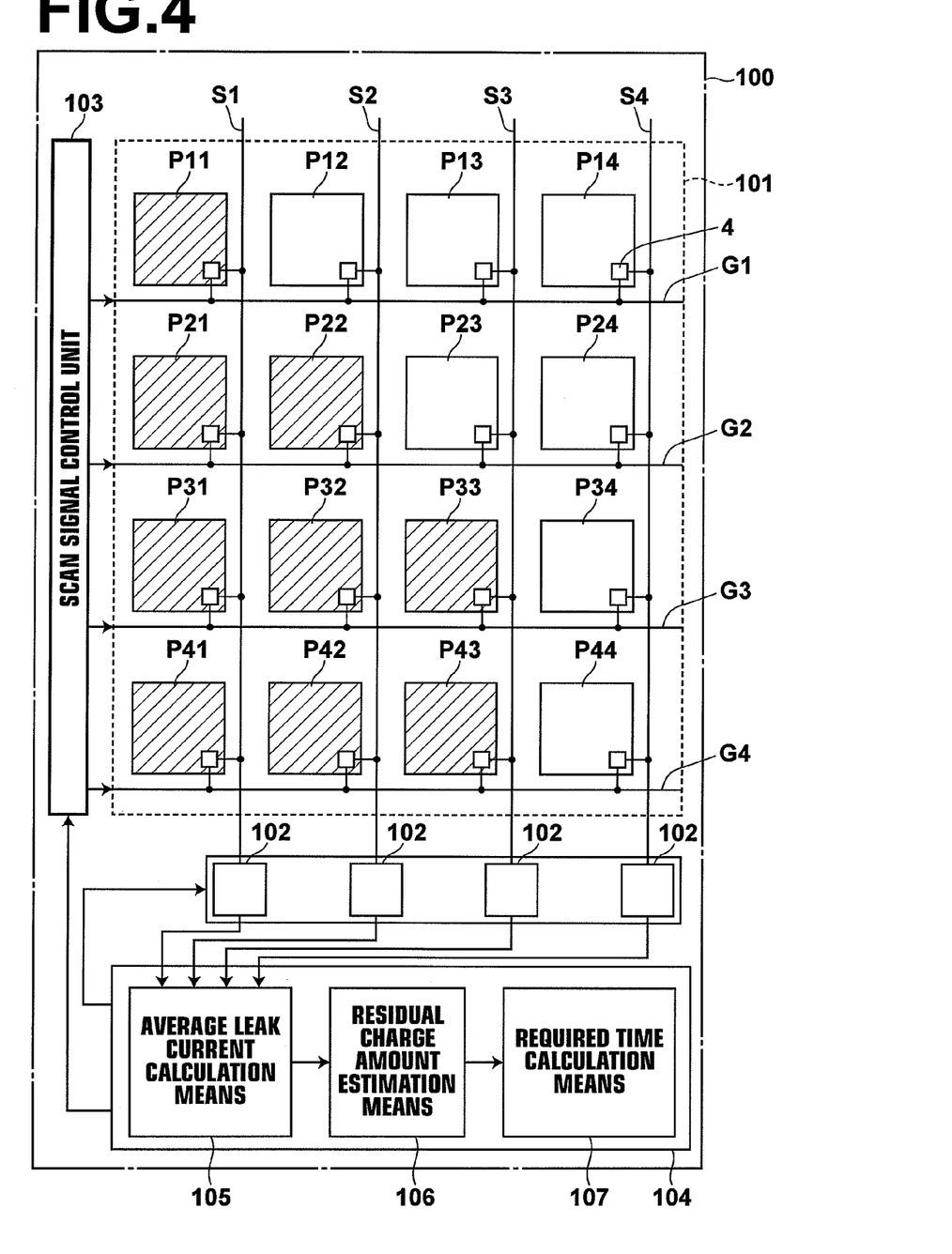
FIG. 4 illustrates an operation of the residual charge amount estimation apparatus shown in FIG. 1.

Thereafter, in the average leak current calculation means 105, a determination is made as to whether each of the image signals D11 to D44 of each of the pixels P11 to P44 detected by each of the signal detectors 102 from each of the data lines S1 to S4 is a saturated value, and the number of saturated pixels having saturated image signal values is calculated with respect to each of the data lines S1 to S4. FIG. 4 indicates pixels having saturated image signal values by receiving a large amount of radiation with hatched lines, and the number of saturated pixels N1 on the data line S1 is 4, the number of saturated pixels N2 on the data line S2 is 3, the number of saturated pixels N3 on the data line S3 is 2, and the number of saturated pixels N4 on the data line S4 is 0 in this case.

Then, for each of the data lines S having a saturated pixel, that is, for data lines S1 to S3 in FIG. 4, the respective leak currents C1 to C3 detected from the respective data lines are divided by the respective numbers of saturated pixels N1 to N3 to calculate respective average leak currents Av1 to Av3 per unit saturated pixel with respect to the respective data lines S1 to S4 and outputted to the residual charge amount estimation means 106. It is noted that a single saturated pixel is designated as the unit saturated pixel here, but two or more saturated pixels may be designated as the unit saturated pixel.

Figure 9:
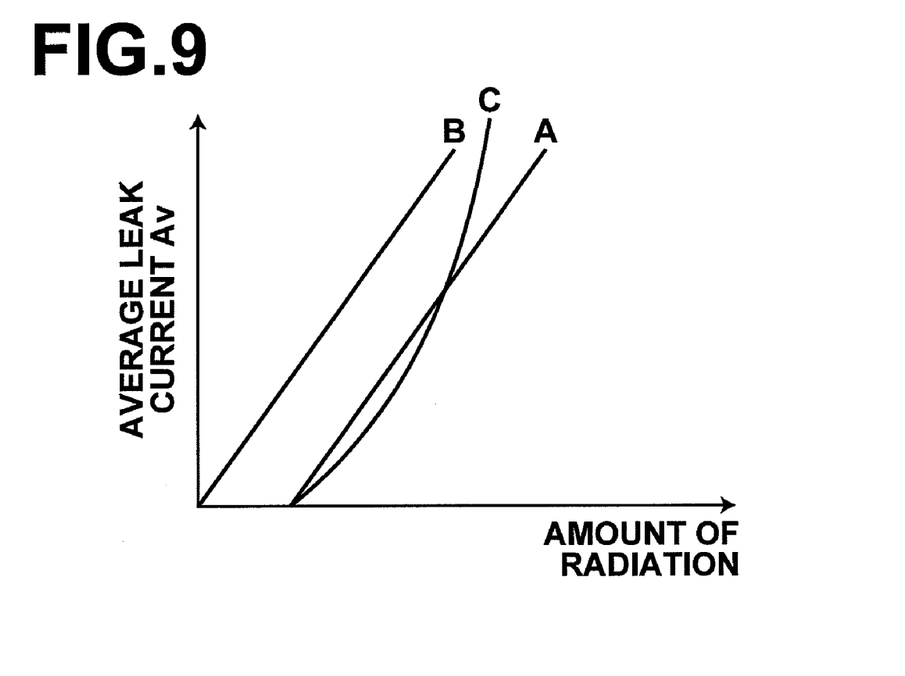
FIG. 9 is a graph illustrating an average leak current versus radiation amount characteristic.
Figure 10:
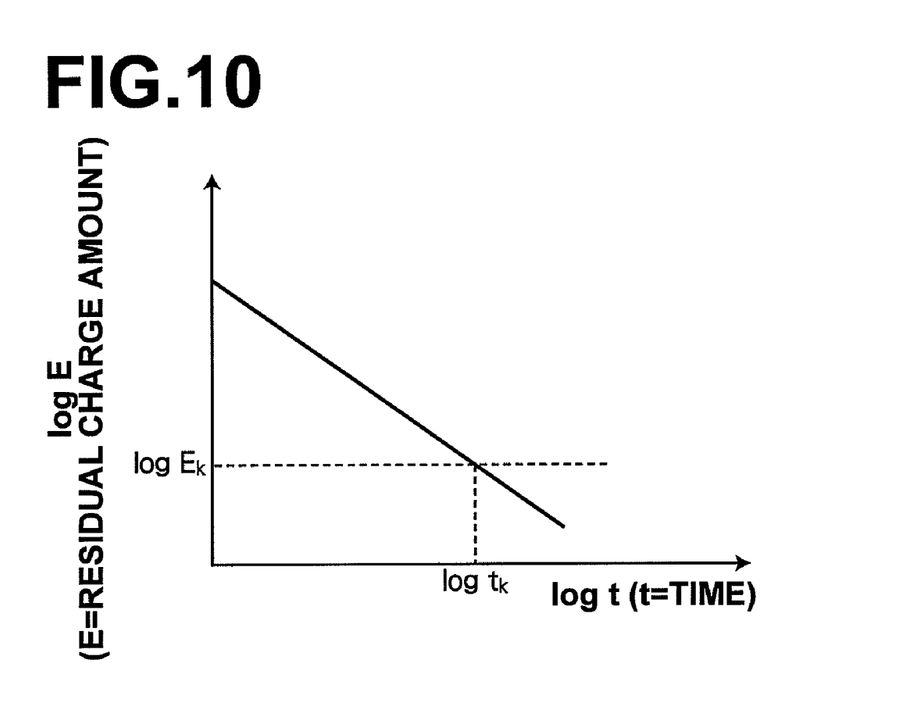
FIG. 10 is a graph illustrating a residual charge decreasing rate characteristic.

Then, in the residual charge amount estimation means 106, an estimated value of the radiation amount irradiated on the saturated pixels on each of the data lines S1 to S3 is obtained from the average leak currents Av1 to Av3 of the respective data lines S1 to S3 obtained by the average leak current calculation means 105 using an average leak current versus radiation amount characteristic obtained in advance, such as the graph A, B, or C shown in FIG. 9, and residual charge amounts E1, E2, and E3 (estimated values of residual charge amounts) remaining in the respective saturated pixels are obtained. Then, a maximum residual charge amount E of the residual charge amounts E1 to E3 is outputted to the required time calculation means 107.

It is noted that the residual charge amount estimation means 106 may be a means that obtains a maximum value of estimated residual charge amount remaining in the radiation image detector using a maximum average leak current Av of the average leak currents Av1 to Av3 on the respective data lines S1 to S3 obtained by the average leak current calculation means 105, and outputs to the required time calculation means 107.

Here, the average leak current Av versus radiation amount characteristic varies with the device characteristics of the radiation image detector used, such as the structure of the TFT switch, polarity of the voltage applied between the bias electrode 7 and Cs electrode 14, radiation conversion method (direct or indirect conversion), and the like. For example, radiation image detectors having therein protection circuits for preventing degradation in the performance of the TFT arising from an excessive amount of charges stored in the capacitor by the irradiation of large amount of radiation have a characteristic like the graph C in which the leak current increases rapidly with increase in the amount of radiation when it exceeds a predetermined value (threshold value). In addition, some radiation image detectors have an average leak current versus radiation amount characteristic like the graph A in which the leak current increases substantially in proportion to the amount of radiation when it exceeds a predetermined threshold value and other radiation image detectors have an average leak current versus radiation amount characteristic like the graph A in which the leak current increases substantially in proportion to the amount of radiation depending on the device characteristics. As described above, the average leak current versus radiation amount characteristic differs depending on the type of the radiation image detector used, the average leak current versus radiation amount characteristic of any type of radiation image detector may be obtained easily by monitoring the average leak current with respect to the amount of radiation in advance.

Then, in the required time calculation means 107, a required time tk for the residual charge amount E to decrease below a predetermined threshold value Ek is calculated using a decreasing rate at which the residual charge amount E decreases with time like that shown in FIG. 6, and the calculated required time tk is outputted to other processing means, such as a warning means 108a, a restriction means 108b, a residual image erasing means 108c, and the like to be described later. Here, the required time tk is a time required for the residual charge amount E to decrease below a predetermined threshold value Ek from a predetermined reference time, and if, for example, the time when the residual radiation amount is estimated by the residual charge amount estimation means 106 is set as the reference time, and processing is performed by various processing means, such as the warning means 108a, restriction means 108b, residual image erasing means 108c, and the like to be described hereinbelow during the time period from the time when the residual radiation amount is estimated to the time when the required time tk is expired.

The warning means 108a causes a warning to be outputted from a display or speaker when, for example, an instruction to start next imaging is inputted by the user, or the like during a time period from the time when the residual charge amount is estimated to the time when the required time tk is expired.

It is noted that the outputting of a warning may take any form as long as the warning is issued at least once during the time period until the required time is expired, such as outputting the warning continuously or at optimum timings, as well as outputting the warning when an instruction to start next imaging is inputted by the user.

The restriction means 108b is a means that restricts the imaging of a radiation image by the radiation image detection apparatus 100 until the required time tk is expired after residual charge amount estimation. For example, it sets the operation mode of the radiation image detection apparatus 100 to "imaging restriction mode", and restricts imaging instructed by the user. Then, it changes the operation mode to "imaging feasible mode" when the required time tk is expired, thereby allowing imaging. Here, an arrangement may be adopted in which a warning notifying the user that the imaging is restricted is issued from a display or a speaker together with the remaining time until the required time is expired when an instruction to start next imaging is inputted by the user during the time period until the required time is expired.

The residual image erasing means 108c is a means that erases the residual image, for example, by performing an image signal readout operation or the like when an instruction to perform imaging is inputted by the user before performing the instructed imaging if the require time tk calculated by the required time calculation means 107 is not expired. It is noted that even in a case where the imaging of a radiation image is restricted by the restriction means until the required time tk is expired, if the instruction to perform imaging is inputted again in response to the warning notifying that the imaging is restricted, the imaging may be made feasible by giving priority to the function desired by the user, and a process for erasing the residual image may be performed prior to performing instructed imaging.

According to the embodiment described above, leak currents flowing out through the data lines with the TFT switches being switched OFF are detected, then the TFT switches connected to each of the scanning lines are sequentially switched ON on a scanning line-by-scanning line basis to read out image signals flowing out through the data lines, an average leak current per unit saturated pixel is calculated from the leak current detected from at least one of the data lines with saturated pixels having saturated image signals and the number of saturated pixels on that data line, and a residual charge amount remaining in the radiation image detection apparatus is estimated based on the average leak current. This may improve the estimation capabilities for estimating the amount of residual charges remaining in the radiation image detector when a large amount of radiation exceeding a predetermined value (a value by which the pixel value is saturated) is irradiated.

Further, a required time for the amount of residual charges to decrease below a predetermined threshold value is calculated using the decreasing rate at which the amount of residual charges decreases with time obtained in advance, and a warning is outputted at lease once. This may notify the user that the amount of residual charges is greater than the predetermined threshold value, and next imaging may be performed at an appropriate timing.

Still further, the image quality of a radiation image obtained by imaging with the radiation image detection apparatus may be maintained at a predetermined level by restricting the imaging until the required time is expired after residual charge amount estimation, and allowing imaging only after the amount of residual charges falls below a predetermined threshold value.

When performing next imaging with the radiation image detection apparatus, if the required time is not expired after residual charge amount estimation, the amount of residual charges may be reduced within an allowable range by performing a process of erasing the residual charges according to the imaging timing desired by the user, thereby the image quality of a radiation image obtained by the imaging may be improved.

Further, the estimation accuracy of the amount of residual charges may be improved by correcting the value of the detected leak current using the decreasing rate at which the amount of leak currents decreases with time obtained in advance based on an elapsed time at the time when the leak current is detected from the time when the radiation is irradiated.

In the embodiment, the description has been made of a case in which the average leak current per unit saturated pixel is calculated for each of a plurality of data lines from the plurality of leak currents detected from the plurality of data lines on which saturated pixels having saturated image signal values are present and the number of saturated pixels on each of the data lines, and the amount of residual charges is estimated based on the average leak currents in the residual charge amount estimation unit 104. But, for example, an arrangement may be adopted in which a single data line is arbitrarily selected from a plurality of data lines on which saturated pixels having saturated image signal values are present, then the average leak current per unit saturated pixel is calculated from the leak current detected from the selected data line and the number of saturated pixels on the data line, and the amount of residual charges remaining in each of the saturated pixels and the amount of residual charges remaining in the entire radiation image detector are estimated based on the average leak current. Further, another arrangement may also be adopted in which the average leak current per unit saturated pixel is calculated from the sum of a plurality of leak currents detected from the plurality of data lines on which saturated pixels having saturated image signal values are present and the sum of the number of saturated pixels on the respective data lines, and the amount of residual charges remaining in each of the saturated pixels on the respective data lines and the amount of residual charges remaining in the entire radiation image detector are estimated based on the average leak current. If the average leak current is calculated from the sum of a plurality of leak currents detected from the plurality of data lines and the sum of the number of saturated pixels on the respective data lines as in the latter case, noise effects may be reduced.

Further, in the embodiment, the description has been made of a case in which the leak current of each of the data lines, which is the sum of the leak signals of all of the saturated pixels on each of the data lines, is obtained by detecting a signal flowing out through each of the data lines with all of the TFT switches being switched OFF, and the average leak current obtained by dividing the leak current by the number of saturated pixels is used for estimating the amount of residual charges. According to a method described hereinbelow, however, a leak current leaking from each of the pixels of the radiation image detector may be detected, and the amount of residual charges remaining in each of the pixels may be individually estimated using the leak current.

More specifically, a leak current R1 flowing out through each of the data lines is detected with all of the TFT switches 4 being switched OFF prior to reading out image signals. The leak current R1 is the sum of the leak current components of all of the pixels connected to the scanning lines G1 to G4. Next, only the TFT switches 4 connected to the scanning line G4 are switched ON to read out image signals D41 to D44 of the pixels P41 to P44 connected to the scanning line G4. Then all of the TFT switches 4 are switched OFF again and a leak current R2 flowing out through each of the data lines is detected. The leak current R2 is the sum of the leak current components of all of the pixels connected to the scanning lines G1 to G3, since the image signals D41 to D44 of the pixels P41 to P44 have already been read out and the leak currents of these pixels have been erased. Next, only the TFT switches 4 connected to the scanning line G3 are switched ON to read out image signals D31 to D34 of the pixels P31 to P34 connected to the scanning line G3. Then all of the TFT switches 4 are switched OFF again and a leak current R3 flowing out through each of the data lines is detected. Finally, only the TFT switches 4 connected to the scanning line G2 are switched ON to read out image signals D21 to D24 of the pixels P21 to P24 connected to the scanning line G2. Then all of the TFT switches 4 are switched OFF again and a leak current R4 flowing out through each of the data lines is detected. Then, the leak current R2 is subtracted from the leak current R1, the leak current R3 is subtracted from the leak current R2, and the leak current R4 is subtracted from the leak current R3 detected from each of the data lines. In this way, the leak current leaked from each of the pixels connected to each of the data lines may be calculated. Thereafter, the amount of residual charges remaining in each of the pixels may be individually estimated using the leak current of each of the pixels obtained in the manner as described above.

Still further, in the embodiment, the description has been made of a case in which a required time tk for the residual charge amount E to decrease below a predetermined threshold value Ek from the time when the residual charge amount is estimated is calculated by the required time calculation means 107. But the required time calculation means 107 may be a means that calculates the required time for the residual charge amount E to decrease below the predetermined threshold value Ek from the time when radiation image data are recorded or from the time when the required time is calculated.

What is claimed is:

1. A residual charge amount estimation method for estimating the amount of residual charges remaining in a radiation image detector which includes a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines through which the charges stored in the capacitors are read out, the method comprising the steps of:
    detecting by a leak current detector a leak current flowing out through each of the data lines with each of the TFT switches being switched OFF;
    reading out by an image signal readout device an image signal flowing out through each of the data lines by sequentially switching ON the TFT switches connected to each of the scanning lines on a scanning line-by-scanning line basis;
    calculating by an average leak current calculation device an average leak current per unit saturated pixel from the leak current detected from at least one of the data lines on which a saturated pixel having a saturated value of the image signal is found and the number of saturated pixels; and
    estimating by a residual charge amount estimation device the amount of residual charges remaining in the unit saturated pixel based on the average leak current.

2. A radiation image detection apparatus for detecting a radiation image using a radiation image detector which includes a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines through which the charges stored in the capacitors are read out, the apparatus comprising:
    a leak current detection means that detects a leak current flowing out through each of the data lines with each of the TFT switches being switched OFF;
    an image signal readout means that reads out an image signal flowing out through each of the data lines by sequentially switching ON the TFT switches connected to each of the scanning lines on a scanning line-by-scanning line basis;
    an average leak current calculation means that calculates an average leak current per unit saturated pixel from the leak current detected from at least one of the data lines on which a saturated pixel having a saturated value of the image signal is found and the number of saturated pixels; and
    a residual charge amount estimation means that estimates the amount of residual charges remaining in the unit saturated pixel based on the average leak current.

3. The radiation image detection apparatus of claim 2, further comprising:
    a required time calculation means that calculates a required time for the amount of residual charges to decrease below a predetermined threshold value using a decreasing rate at which the amount of residual charges decreases with time obtained in advance; and
    a warning means that outputs a warning at least once during a time period from the time when the amount of residual charges is estimated to the time when the required time is expired.

4. The radiation image detection apparatus of claim 3, further comprising:
    a required time calculation means that calculates a required time for the amount of residual charges to decrease below a predetermined threshold value using a decreasing rate at which the amount of residual charges decreases with time obtained in advance; and
    a restriction means that restricts imaging a radiation image with the radiation image detector during a time period from the time when the amount of residual charges is estimated to the time when the required time is expired.

5. The radiation image detection apparatus of claim 3, further comprising:
    a required time calculation means that calculates a required time for the amount of residual charges to decrease below a predetermined threshold value using a decreasing rate at which the amount of residual charges decreases with time obtained in advance; and
    a residual charge erasing means that erases the residual charges at the time of next imaging after estimating the amount of residual charges and if the required time is not expired.

6. The radiation image detection apparatus of claim 3, wherein the leak current detection means includes a leak current correction means that corrects the value of the detected leak current using a decreasing rate at which the amount of leak currents decreases with time obtained in advance based on an elapsed time at the time when the leak current is detected from the time when the radiation is irradiated.

7. The radiation image detection apparatus of claim 2, further comprising:
    a required time calculation means that calculates a required time for the amount of residual charges to decrease below a predetermined threshold value using a decreasing rate at which the amount of residual charges decreases with time obtained in advance; and
    a restriction means that restricts imaging a radiation image with the radiation image detector during a time period from the time when the amount of residual charges is estimated to the time when the required time is expired.

8. The radiation image detection apparatus of claim 7, further comprising:
a required time calculation means that calculates a required time for the amount of residual charges to decrease below a predetermined threshold value using a decreasing rate at which the amount of residual charges decreases with time obtained in advance; and
a residual charge erasing means that erases the residual charges at the time of next imaging after estimating the amount of residual charges and if the required time is not expired.

9. The radiation image detection apparatus of claim 7, wherein the leak current detection means includes a leak current correction means that corrects the value of the detected leak current using a decreasing rate at which the amount of leak currents decreases with time obtained in advance based on an elapsed time at the time when the leak current is detected from the time when the radiation is irradiated.

10. The radiation image detection apparatus of claim 2, further comprising:
a required time calculation means that calculates a required time for the amount of residual charges to decrease below a predetermined threshold value using a decreasing rate at which the amount of residual charges decreases with time obtained in advance; and
a residual charge erasing means that erases the residual charges at the time of next imaging after estimating the amount of residual charges and if the required time is not expired.

11. The radiation image detection apparatus of claim 10, wherein the leak current detection means includes a leak current correction means that corrects the value of the detected leak current using a decreasing rate at which the amount of leak currents decreases with time obtained in advance based on an elapsed time at the time when the leak current is detected from the time when the radiation is irradiated.

12. The radiation image detection apparatus of claim 2, wherein the leak current detection means includes a leak current correction means that corrects the value of the detected leak current using a decreasing rate at which the amount of leak currents decreases with time obtained in advance based on an elapsed time at the time when the leak current is detected from the time when the radiation is irradiated.

13. An auxiliary storage device encoded with a computer program product comprising a residual charge amount estimation program for causing a computer to perform a residual charge estimation method for estimating the amount of residual charges remaining in a radiation image detector which includes a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines through which the charges stored in the capacitors are read out, the method comprising the steps of:
detecting a leak current flowing out through each of the data lines with each of the TFT switches being switched OFF;
reading out an image signal flowing out through each of the data lines by sequentially switching ON the TFT switches connected to each of the scanning lines on a scanning line-by-scanning line basis;
calculating an average leak current per unit saturated pixel from the leak current detected from at least one of the data lines on which a saturated pixel having a saturated value of the image signal is found and the number of saturated pixels; and
estimating the amount of residual charges remaining in the unit saturated pixel based on the average leak current, said residual charges being representative of residual noise.

14. An auxiliary storage device encoded with the computer program product comprising the residual charge amount estimation program of claim 13, the method further comprising:
outputting the amount of residual charges remaining in the unit saturated pixel to a required time calculation device;
calculating by the required time calculation device a required time for the amount of residual charges to decrease below a predetermined threshold value using a decreasing rate at which the amount of residual charges decreases with time obtained in advance; and
at least one of:
outputting a warning at least once during a time period from the time when the amount of residual charges is estimated to the time when the required time is expired;
restricting imaging a radiation image with the radiation image detector during a time period from the time when the amount of residual charges is estimated to the time when the required time is expired; and
erasing the residual charges at the time of next imaging after estimating the amount of residual charges and if the required time is not expired.

* * * * *